US012631776B2

(12) United States Patent
Liu et al.

(10) Patent No.: US 12,631,776 B2
(45) Date of Patent: May 19, 2026

(54) METHOD TO DETERMINE POROMECHANICAL PROPERTIES OF FLUID-SATURATED ROCK

(71) Applicant: ARAMCO SERVICES COMPANY, Houston, TX (US)

(72) Inventors: Chao Liu, Brookshire, TX (US); Dung T. Phan, Brookshire, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 703 days.

(21) Appl. No.: 18/065,392

(22) Filed: Dec. 13, 2022

(65) Prior Publication Data

US 2024/0192391 A1      Jun. 13, 2024

(51) Int. Cl.
| | |
|---|---|
| *G01V 1/30* | (2006.01) |
| *G01V 1/46* | (2006.01) |
| *G01V 20/00* | (2024.01) |
| *G06F 17/16* | (2006.01) |

(52) U.S. Cl.
CPC .............. *G01V 1/306* (2013.01); *G01V 1/303* (2013.01); *G01V 1/46* (2013.01); *G01V 20/00* (2024.01); *G06F 17/16* (2013.01); *G01V 2210/6244* (2013.01)

(58) Field of Classification Search
CPC .......... G01V 1/306; G01V 1/303; G01V 1/46; G01V 20/00; G01V 2210/6244; G06F 17/16
See application file for complete search history.

(56) References Cited

U.S. PATENT DOCUMENTS

| | | | |
|---|---|---|---|
| 11,573,348 B1 * | 2/2023 | Gao .......................... | G01V 3/38 |
| 2002/0128777 A1 | 9/2002 | Fanini | |
| 2009/0145600 A1 | 6/2009 | Wu | |
| 2016/0109593 A1 | 4/2016 | Saxena | |

(Continued)

FOREIGN PATENT DOCUMENTS

| | | |
|---|---|---|
| CN | 107367763 A | 11/2017 |
| CN | 113552627 A | 10/2021 |

(Continued)

OTHER PUBLICATIONS

Kadhim et al. "Using well logs data to estimate dynamic elastic properties of carbonate formation" International Journal of Physical and Human Geography. 4:2 pp. 1-15, Jun. 2016 (15 pages).

(Continued)

*Primary Examiner* — Elias Desta
(74) *Attorney, Agent, or Firm* — Osha Bergman Watanabe & Burton LLP

(57) ABSTRACT

Systems and methods are disclosed. The method includes obtaining well data for a fluid-saturated rock and obtaining a poroelastodynamic relationship linking a deformation of the fluid-saturated rock to a poromechanical property of the fluid-saturated rock. The method further includes determining the poromechanical property of the fluid-saturated rock by applying a vector operator to the poroelastodynamic relationship. The method still further includes determining a value of the poromechanical property by substituting the well data into the vector-operated poroelastodynamic relationship.

16 Claims, 6 Drawing Sheets

400

402
Obtain well data for a fluid-saturated rock

404
Obtain a poroelastodynamic relationship linking a deformation of the fluid-saturated rock to a poromechanical property 406
Determine the poromechanical property of the fluid-saturated rock by applying a vector operator to the poroelastodynamic relationship 408
Determine a value of the poromechanical property by substituting the well data into the vector-operated poroelastodynamic relationship

(56) References Cited

U.S. PATENT DOCUMENTS

| | | |
|---|---|---|
| 2016/0290113 A1 | 10/2016 | Kisra et al. |
| 2017/0023689 A1* | 1/2017 | Spence ................. G01V 11/00 |
| 2018/0031732 A1 | 2/2018 | Mosse et al. |
| 2018/0038974 A1 | 2/2018 | Roy et al. |
| 2020/0158907 A1* | 5/2020 | Li ........................... E21B 41/00 |
| 2021/0173976 A1 | 6/2021 | Ma et al. |

FOREIGN PATENT DOCUMENTS

| | | | |
|---|---|---|---|
| WO | 2017127476 A1 | 7/2017 | |
| WO | WO-2020076783 A1 * | 4/2020 | .............. G01V 3/32 |

OTHER PUBLICATIONS

Biot, M.A. "Theory of propagation of elastic waves in a fluid saturated porous solid. I. Low frequency range" J. Acoust. Soc. Am., 28: 168-178, Mar. 1956 (12 pages).

Office Action issued by Saudi Arabian patent office for corresponding Saudi Arabian patent application No. 123451034, mailed Nov. 26, 2024 (5 pages).

* cited by examiner

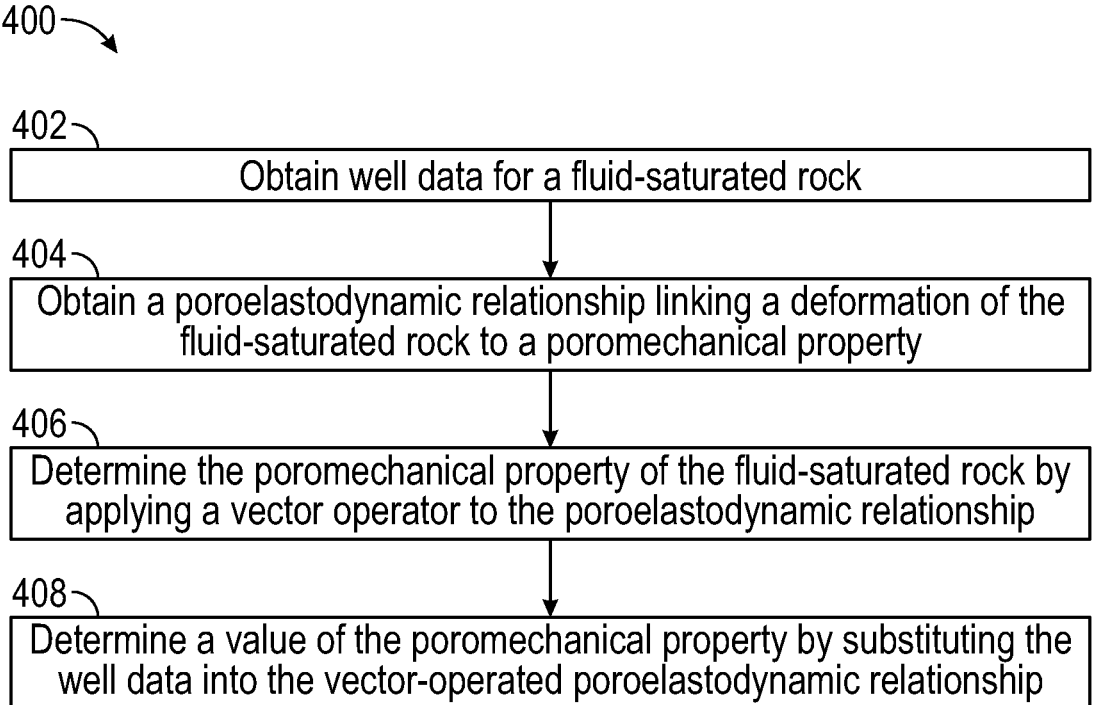

400

402 — Obtain well data for a fluid-saturated rock

404 — Obtain a poroelastodynamic relationship linking a deformation of the fluid-saturated rock to a poromechanical property 406 — Determine the poromechanical property of the fluid-saturated rock by applying a vector operator to the poroelastodynamic relationship 408 — Determine a value of the poromechanical property by substituting the well data into the vector-operated poroelastodynamic relationship

FIG. 4

METHOD TO DETERMINE POROMECHANICAL PROPERTIES OF FLUID-SATURATED ROCK

BACKGROUND

Formation rock may be modelled based on a variety of assumptions. For example, the theory of elasticity may model formation rock as homogenous isotropic media. However, formation rock may actually be porous media where fluid, such as air, water, or hydrocarbons, saturate the pores. The theory of poroelasticity may model formation rock as porous media. Thus, the theory of poroelasticity may consider the elastic properties of the media as well as the viscoelastic properties of the fluid-saturated pores and the interactions between the media and the fluid of formation rock.

The theory of elasticity may further model formation rock without considering the frequency dependance of poromechanical properties of formation rock. However, the theory of poroelasticity may consider the frequency dependance of poromechanical properties of formation rock.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method. The method includes obtaining well data for a fluid-saturated rock and obtaining a poroelastodynamic relationship linking a deformation of the fluid-saturated rock to a poromechanical property of the fluid-saturated rock. The method further includes determining the poromechanical property of the fluid-saturated rock by applying a vector operator to the poroelastodynamic relationship. The method still further includes determining a value of the poromechanical property by substituting the well data into the vector-operated poroelastodynamic relationship.

In general, in one aspect, embodiments relate to a non-transitory computer readable medium storing instructions executable by a computer processor. The instructions include functionality for receiving well data for a fluid-saturated rock and obtaining a poroelastodynamic relationship linking a deformation of the fluid-saturated rock to a poromechanical property of the fluid-saturated rock. The instructions further include functionality for determining the poromechanical property of the fluid-saturated rock by applying a vector operator to the poroelastodynamic relationship. The instructions still further include functionality for determining a value of the poromechanical property by substituting the well data into the vector-operated poroelastodynamic relationship.

In general, in one aspect, embodiments relate to a system. The system includes a well logging system to obtain well data for a fluid-saturated rock and a computer processor configured to receive the well data. The computer processor is further configured to receive a poroelastodynamic relationship linking a deformation of the fluid-saturated rock to a poromechanical property of the fluid-saturated rock and determine the poromechanical property of the fluid-saturated rock by applying a vector operator to the poroelastodynamic relationship. The computer processor is still further configured to determine a value of the poromechanical property by substituting the well data into the vector-operated poroelastodynamic relationship.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIG. 4 shows a flowchart in accordance with one or more embodiments.

DETAILED DESCRIPTION

Figure 1B:
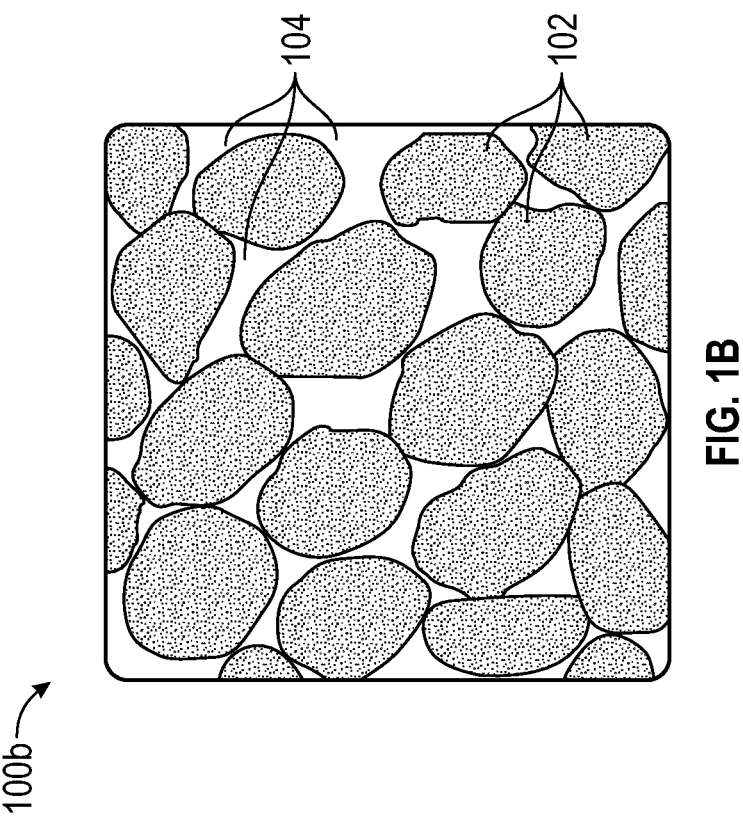
FIGS. 1A and 1B illustrate porous media in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

It is to be understood that the singular forms "a," "an," and "the" include plural referents unless the context clearly dictates otherwise. Thus, for example, reference to "a fluid-saturated rock" includes reference to one or more of such rocks.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowchart may be omitted, repeated, and/or performed in a different order than the order shown. Accordingly, the scope disclosed herein should not be considered limited to the specific arrangement of steps shown in the flowchart.

Although multiple dependent claims are not introduced, it would be apparent to one of ordinary skill that the subject matter of the dependent claims of one or more embodiments may be combined with other dependent claims.

In the following description of FIGS. 1-6, any component described regarding a figure, in various embodiments disclosed herein, may be equivalent to one or more like-named components described regarding any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described regarding a corresponding like-named component in any other figure.

In the oil and gas industry, the drilling and completion of a well may be based on a well trajectory plan and hydraulic fracturing plan. The well trajectory plan and hydraulic fracturing plan may use values of poromechanical properties of formation rock (hereinafter "rock") that the well traverses to inform, at least in part, what path the well should follow, what mud density windows should be used to maintain hydrostatic well pressure during drilling, how to maintain well stability, and what completion strategies should adequately stimulate the hydrocarbon reservoir. Systems and methods are disclosed to determine a value of a poromechanical property of rock.

Figure 1A:
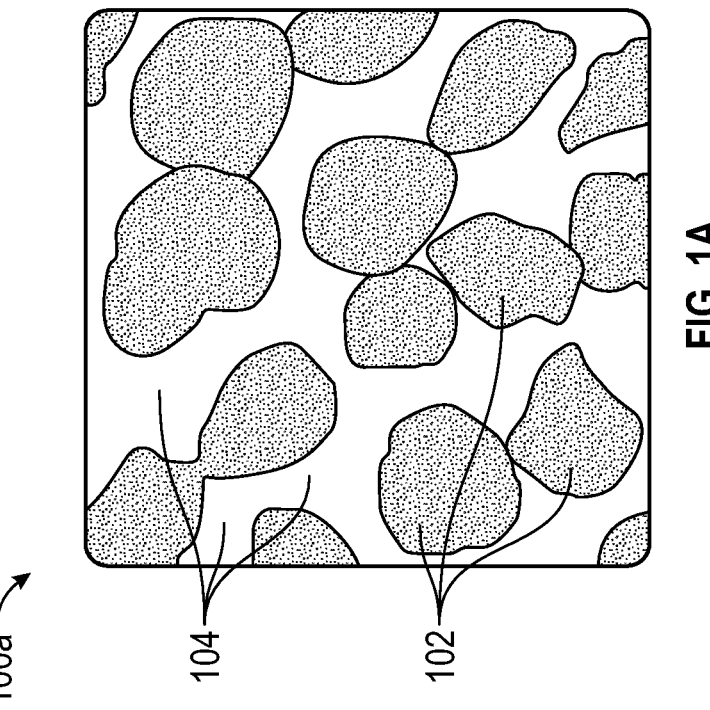

FIGS. 1A and 1B present porous media (100a, b). A porous medium (100a, b) may be defined as a material that contains voids or space. For example, a sponge may be considered a porous medium (100a, b) where the material is a continuous matrix. A rock may also be considered a porous medium (100a, b) where the material is a collection of grains (102) composed of, but not limited to, sandstone, carbonate, or shale. Sandstone, carbonate, and shale may all be considered rock types. The voids or space between the material may present as pores (104) within porous media (100a, b). The pores (104) may be saturated with fluid. The fluid may be a gas or a liquid. For example, the pores (104) of the sponge may be saturated with water. The pores (104) of the rock may be saturated with, but not limited to, air, natural gas, water, brine, or other hydrocarbons. The material of and the fluid within the porous media (100a, b) may be referred to as the constituents of porous media (100a, b). Hereinafter, a "fluid-saturated porous medium" describes a porous material where fluid saturates the pores (104). Hereinafter, a "fluid-saturated porous medium" is also referred to as simply "a porous medium." Similarly, the term "rock" or "fluid-saturated rock" refers to a rock where fluid saturates the pores (104).

The material of the grains (102), fluid within the pores (104), and size, shape, and spacing of the grains (102) and pores (104) dictate physical properties of porous media (100a, b). Physical properties of porous media (100a, b) include, but are not limited to, porosity $\phi$ and permeability as well as the physical properties of the constituents of the porous media (100a, b). Porosity is defined as the fraction of the volume of porous media (100a, b) that is occupied by the pores (104). For example, sedimentary rock typically has a porosity between 0.1% to 40%. Thus, porosity is a measure of how much fluid porous media (100a, b) can hold. Permeability is closely related to porosity. Permeability is a measure of how easily fluid flows through the porous media (100a, b). The degree of connection between the pores (104) constrains permeability. Thus, FIG. 1A may depict a porous medium (100a) with high porosity and high permeability. FIG. 1B may depict another porous medium (100b) with low porosity and low permeability. Note that high porosity, low permeability porous media (100a, b) and low porosity, high permeability porous media (100a, b) can also exist.

Physical properties of the constituents (i.e., the material and fluid) of porous media (100a, b) include mass density $\rho_a$ and fluid density $\rho_f$. Density is a measure of mass per unit volume. Thus, mass density $\rho_a$ is the density of the material of the porous media (100a, b). While fluid density $\rho_f$ is the density of the fluid saturating the pores (104) of the porous media (100a, b).

The material of the grains (102), fluid within the pores (104), and the size, shape, and spacing of the grains (102) and pores (104) also dictate the behavior of porous media (100a, b). For example, the material of the grains (102) may present elastic behavior or elastic deformation in that following the removal of a force being applied to the porous media (100a, b), the material returns to its undeformed shape. Opposite to elastic behavior is plastic behavior or plastic deformation where the material maintains a deformed shape following the removal of a force. Some porous media (100a, b) may exhibit elastic behavior when small forces are removed and plastic behavior when large forces are removed. The fluid saturating the pores (104) may present viscoelastic behavior in that the fluid presents both viscous behavior and elastic behavior. Viscous behavior may be quantified by the viscosity of the fluid saturating the pores (104) where viscosity is a measure of the fluid's rate of resistance to deform when a force is being applied or removed.

Figure 2A:
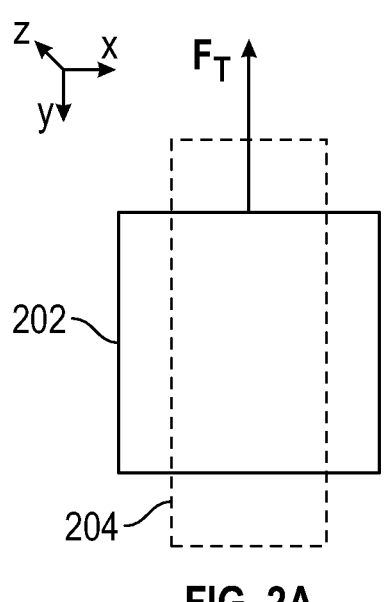
FIGS. 2A through 2E illustrate deformations in accordance with one or more embodiments.

FIGS. 2A through 2E depict forces deforming fluid-saturated porous media (100a, b). Forces may include tensile, compressive, shearing, torsional, and bending forces. FIG. 2A illustrates tension where a tensile force $F_T$ deforms a unit volume (202) of a porous medium (100a, b). As the tensile force $F_T$ is applied to the unit volume (202), the unit volume (202) may deform along one or more directions denoted by the orthogonal x, y, and z axes to create a first deformed volume (204). In practice, the tensile force $F_T$ may be normalized by dividing by the cross-sectional area of the unit volume (202) perpendicular to the tensile force $F_T$. A normalized force is denoted "stress." Further, the change in length along any axis may be normalized by dividing by the original length of the unit volume (202). A normalized change in length is denoted "strain." A ratio of stress versus strain may be referred to as a "modulus."

Figure 2B:
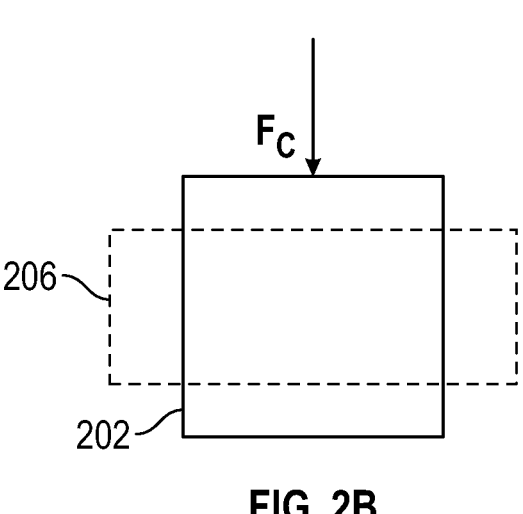
Figure 2C:
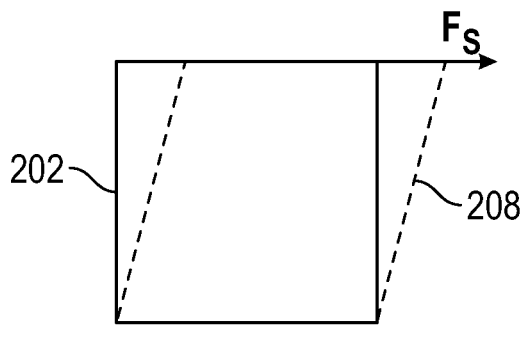
Figure 2D:
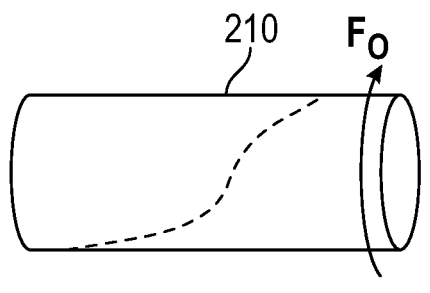
Figure 2E:
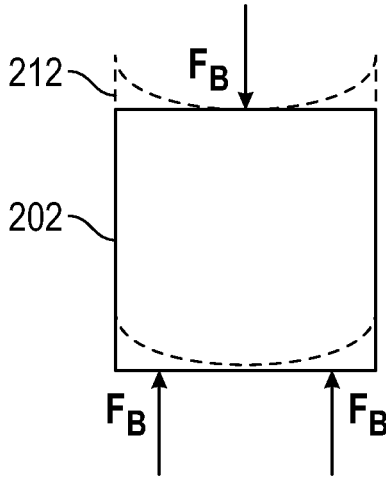

FIG. 2B illustrates compression where a compressional force $F_C$ deforms the unit volume (202) of a porous medium (100a, b) to create a second deformed volume (206). FIGS. 2A and 2B occur due to forces orthogonal to the unit volume (202). FIG. 2C illustrates shearing where a parallel shear force $F_S$ deforms a unit volume (202) to create a third deformed volume (208). FIG. 2D illustrates torsion where a torsional force $F_O$ acts on a cylindrical unit volume (210) to twist the cylindrical unit volume (210). Lastly, FIG. 2E illustrates bending where bending forces $F_B$ deform the unit volume (202) in such a way that the unit volume (202) bends or bows to create a fourth deformed volume (212).

FIGS. 2A through 2E depict linear deformations of fluid-saturated porous media (100a, b) due to various forces. Poromechanics is the branch of mechanics that studies the behavior of fluid-saturated porous media (100a, b) due to deformation. Further, poroelastics is the branch of poromechanics that studies the elastic behavior of fluid-saturated porous media (100a, b) due to deformation. Poroelastics may be separated into two categories: statics and dynamics.

In statics, a static or stationary force may be applied to the fluid-saturated porous media (100a, *b*). In dynamics, a dynamic force or a force with an acceleration may be applied to fluid-saturated porous media (100a, *b*). As such, poroelastodynamics is a branch of poromechanics that studies the elastic dynamic behavior of fluid-saturated porous media (100a, *b*) due to deformation.

Hereinafter, "poromechanical properties" will denote the mechanical properties of fluid-saturated porous media (100a, *b*) due to elastic deformation. Poromechanical properties include, but are not limited to, Poisson's ratio υ, Biot's coefficient α, Young's modulus E, shear modulus G, and Biot's modulus M. Poisson's ratio υ is a unitless measure of strain perpendicular to a force relative to strain parallel to a force (i.e., transverse strain versus axial strain). Biot's coefficient α is a measure of fluid volume change induced by bulk volume changes when a porous medium is void of fluid. Young's modulus E is a measure of stress versus strain from elastic tensile or compressive deformations. Shear modulus G is a measure of stress versus strain for elastic shear deformations. The shear modulus G may also be referred to as a Lamé parameter. Biot's modulus M is the inverse of storativity. Storativity is a dimensionless measure of the volume fraction of fluid that will discharge from fluid-saturated porous media (100a, *b*) under gravity per unit of the porous media (100a, *b*) and per unit length of pressure.

Under specific assumptions, some poromechanical properties may be determined from other poromechanical properties. For example, the theory of elasticity (specifically, the theory of elastodynamics) that assumes homogeneous isotropic linear elastic materials asserts:

$$E = \frac{G(3\lambda + 2G)}{\lambda + G},$$

Equation (1)

$$v = \frac{\lambda}{2(\lambda + G)}, \text{ and}$$

Equation (2)

$$E = 2G(1 + v),$$

Equation (3)

where λ is a Lamé parameter. Homogeneity assumes media to be uniform throughout its volume. Isotropy assumes poromechanical properties of the media to be the same regardless of the direction the poromechanical property is measured in. A person of ordinary skill in the art will appreciate that relationships other than Equations (1) through (3) may be used to determine poromechanical properties assuming homogeneous isotropic linear elastic materials.

The theory of elasticity may not consider the viscoelastic behavior of the fluid-saturated pores (104) within porous media (100a, *b*) or the interactions between the material and the fluid saturating the pores (104) of the porous media (100a, *b*). Further, the theory of elasticity may not consider the frequency dependence of the poromechanical properties of porous media (100a, *b*). However, the theory of poroelasticity may consider these. The theory of poroelasticity is attributed to Maurice Anthony Biot. In a series of papers published in the early to mid-20th century, Biot developed the theory of poroelasticity. Specifically, Biot developed a poroelastodynamic relationship that may be written in the frequency domain as:

$$G\nabla^2 u + \left(\lambda + \alpha^2 M + G\right)\nabla(\nabla \cdot u) +$$

Equation (4)

$$\alpha M \nabla(\nabla \cdot w) + \omega^2 \rho u + \omega^2 \rho_f w = 0, \text{ and}$$

$$\alpha M \nabla(\nabla \cdot u) + M \nabla(\nabla \cdot w) +$$

Equation (5)

$$\omega^2 \rho_f u + \omega^2 \left(\frac{\rho_f}{\phi} + \frac{\rho_a}{\phi^2} + \frac{i}{\omega \kappa}\right) w = 0.$$

In Equations (4) and (5), u is the change in length of the material of the porous medium (100a, *b*) and w is the change in length of the fluid relative to the material of the porous medium (100a, *b*) due to deformation. Further, α is Biot's coefficient, ρ is overall density, ω is the frequency, κ is the mobility, and i=√−1. Note that mobility κ is the ratio of the permeability of the porous medium (100a, *b*) to the viscosity of the fluid of the porous medium (100a, *b*) at a specified temperature and pressure. Further still, ∇ is the gradient operator, ∇• is the divergence operator, and ∇² is the Laplacian operator. The terms ∇, ∇•, and ∇² are all examples of vector operators. Lastly, to reiterate, G is shear modulus, M is Biot's modulus, $\rho_a$ is mass density, and $\rho_f$ is fluid density.

It may be useful to determine a value of a poromechanical property for the porous media (100a, *b*) of fluid-saturated rock, in situ, within a subterranean region of interest. The value of the poromechanical property of rock may be used, in part, to inform a well trajectory plan and/or a hydraulic fracturing plan. For example, the value of the poromechanical property of rock may inform, in part, what path a well should follow, how to maintain well stability, what mud density windows should be used to maintain hydrostatic well pressure during drilling, and what completion strategies should adequately stimulate the hydrocarbon reservoir the well penetrates. Further, determining a value of a poromechanical property in a laboratory may be complex and/or expensive.

Figure 3:
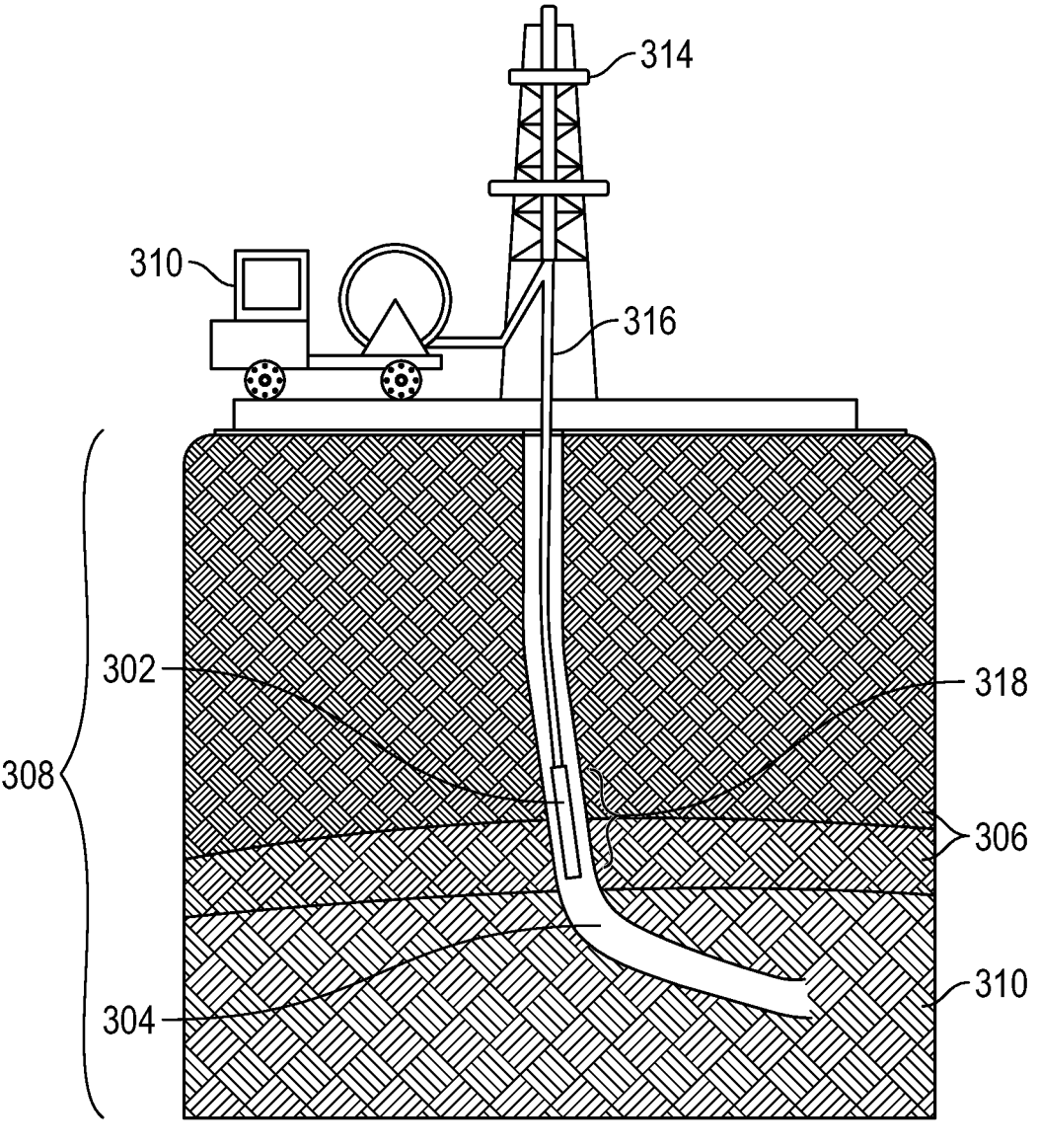
FIG. 3 depicts a well logging system downhole in accordance with one or more embodiments.

In some embodiments, well data, such as well logs, may be used to determine a value of a poromechanical property for fluid-saturated rock, in situ, within a subterranean region of interest. The well data may be acquired using a well logging system. FIG. 3 illustrates a well logging system (302) within a well (304) or "downhole" in accordance with one or more embodiments. The well (304) may traverse various rock types (306) within a subterranean region of interest (308) that may include cap rock to ultimately penetrate a hydrocarbon reservoir (310). Note that the hydrocarbon reservoir (310) may itself be a fluid-saturated rock. Each rock type (306) and the hydrocarbon reservoir (310) may be deformed due to the weight of overburden rock types (306).

The well logging system (302) may be lowered into the well (304) to determine rock type (306), physical properties, poromechanical properties, and wave properties that characterize the subterranean region of interest (308) surrounding the well (304). The well logging system (302) may be supported by a truck (312) and derrick (314) above ground. For example, the truck (312) may be attached to a conveyance mechanism (316) used to lower the well logging system (302) into the well (304). The conveyance mechanism (316) may be a wireline, coiled tubing, or drillpipe that may include means to provide power to the well logging system (302) and a telemetry channel from the well logging system (302) to the surface. In some embodiments, the well logging system (302) may be translated along the depth of the well (304) to acquire well data over multiple depth intervals (318).

The well logging system (302) may be, but is not limited to, a gamma ray logging tool, neutron porosity logging tool, density logging tool, and acoustic logging tool. In some embodiments, the acoustic logging tool may be a sonic logging tool that operates between 3 and 15 kilohertz (kHz). In other embodiments, the acoustic logging tool may be a dipole shear sonic imager. A gamma ray log acquired using a gamma ray logging tool may be used to separate a depth interval (318) by rock type (306). Following rock type (306) identification, the poromechanical properties of Poisson's ratio $\upsilon$ and Biot's coefficient $\alpha$ may be estimated. For example, Poisson's ratio $\upsilon$ may range from 0.12 to 0.20 for the rock type (306) of sandstone and 0.30 to 0.35 for the rock type (306) of shale. Further, Biot's coefficient $\alpha$ may range from 0.65 to 0.85 for sandstone and 0.95 to 1.00 for shale. A neutron porosity log (hereinafter "porosity log") acquired using a neutron porosity logging tool may be used to determine porosity $\phi$. A density log acquired using a density logging tool may be used to determine overall density $\rho$. An acoustic log acquired using an acoustic logging tool may be used to determine wave properties such as shear wave phase velocity $V_s$ (hereinafter also "S-wave velocity"), compressional wave phase velocity $V_p$ (hereinafter also "P-wave velocity"), and fast compressional wave phase velocity $V_{p1}$ (hereinafter also "fast P-wave velocity").

The theory of elasticity may further assert that:

$$G = \rho V_s^2, \text{ and} \qquad \text{Equation (6)}$$

$$\lambda + 2G = \rho V_p^2. \qquad \text{Equation (7)}$$

However, similar to Equations (1) through (3), Equations (6) and (7) may not consider the viscoelastic behavior of the fluid-saturated pores (104) within porous media (100$a$, $b$) or the interactions between the material and fluid saturating the pores (104) of porous media (100$a$, $b$). Further, Equations (6) and (7) may not consider the frequency affects that the acoustic logging tool has on determining S-wave velocity $V_s$, P-wave velocity $V_p$, and fast P-wave velocity $V_{p1}$.

FIG. 4 shows a flowchart for a method (400) of determining a value of a poromechanical property using a poroelastodynamic relationship and well data.

In step 402, well data is obtained for a fluid-saturated rock. In some embodiments, the well data may be well logs as described with respect to FIG. 3. In other embodiments, the well data may be measured from rock core samples collected during drilling of a well (304). The well data may measure or be used to estimate rock type (306), physical properties, poromechanical properties, and/or wave properties of fluid-saturated rock such as, but not limited to, porosity $\phi$, overall density $\rho$, Poisson's ratio $\upsilon$, Biot's coefficient $\alpha$, S-wave velocity $V_s$, and fast P-wave velocity $V_{p1}$.

In step 404, a poroelastodynamic relationship is obtained. The poroelastodynamic relationship may link a deformation of a fluid-saturated rock to a poromechanical property of the fluid-saturated rock. One or more types of linear deformations as described in FIGS. 2A through 2E may present within the poroelastodynamic relationship. In some embodiments, the poroelastodynamic relationship may be Equations (4) and (5) where the deformation is presented as a change in length. In other embodiments, the poroelastodynamic relationship may be in a domain other than the frequency domain as Equations (4) and (5) are. Further, the deformation may be presented as force, strain, and/or stress. Further, the poroelastodynamic relationship may link a deformation to poromechanical properties other than shear modulus G and Biot's modulus M as Equations (4) and (5) do.

In step 406, a poromechanical property is determined by applying a vector operator to the poroelastodynamic relationship. The vector operator may be, but is not limited to, the gradient operator $\nabla$, the divergence operator $\nabla\bullet$, the curl operator $\nabla\times$, and the Laplacian operator $\nabla^2$. In some embodiments, the vector-operated poroelastodynamic relationship may link a wave phase velocity, such as shear wave phase velocity $V_s$ and fast compressional wave phase velocity $V_{p1}$, to the poromechanical property of the fluid-saturated rock. In some embodiments, the poromechanical property may be determined by solving for the poromechanical property within the vector-operated poroelastodynamic relationship. In other embodiments, the poromechanical property may be determined by approximating the poromechanical property using the vector-operated poroelastodynamic relationship. In some embodiments, approximating may include neglecting terms, assuming terms, and/or modeling terms within the vector-operated poroelastodynamic relationship.

For example, applying the curl operator $\nabla\times$ to Equations (4) and (5) gives a vector-operated poroelastodynamic relationship where:

$$V_s^2 \nabla^2 (\nabla \times u) + \omega^2 (\nabla \times u) = 0, \text{ where} \qquad \text{Equation (8)}$$

$$V_s = \sqrt{\dfrac{G}{\rho - \dfrac{\rho_f^2}{\dfrac{\rho_f}{\phi} + \dfrac{\rho_a}{\phi^2} + \dfrac{i}{\omega\kappa}}}}. \qquad \text{Equation (9)}$$

In some embodiments, a first term such as the mass density $\rho_a$ may be neglected. Further, a first term such as the fluid density $\rho_f$ may be assumed or estimated. For example, fluid density $\rho_f$ may be assumed to be the same as the drilling mud density. Assuming the first term of mass density $\rho_a$ is neglected, Equation (9) may be approximated for the shear modulus G as:

$$G \approx (\rho - \rho_f \phi) V_s^2. \qquad \text{Equation (10)}$$

In another example, the divergence operator $\nabla\bullet$ is applied to Equations (4) and (5) to give a vector-operated poroelastodynamic relationship where:

$$\left(V_{p1}^2 \nabla^2 \Phi + \omega^2 \Phi\right)\left(V_{p2}^2 \nabla^2 \Phi + \omega^2 \Phi\right) = 0, \text{ where} \qquad \text{Equation (11)}$$

$$V_{p1} = \sqrt{\dfrac{2M(\lambda + 2G)}{b - \sqrt{b^2 - 4cM(\lambda + 2G)}}}, \text{ where} \qquad \text{Equation (12)}$$

$$b = \left(\dfrac{\rho_f}{\phi} + \dfrac{\rho_a}{\phi^2} + \dfrac{i}{\omega\kappa}\right)(\lambda + 2G + \alpha^2 M) + \rho M - 2\rho_f \alpha M \text{ and} \qquad \text{Equation (13)}$$

$$c = \rho\left(\dfrac{\rho_f}{\phi} + \dfrac{\rho_a}{\phi^2} + \dfrac{i}{\omega\kappa}\right) - \rho_f^2. \qquad \text{Equation (14)}$$

In some embodiments, first terms such as the mass density $\rho_a$, i, and $\rho-2\rho_f\alpha$ may be neglected. Assuming the first terms of mass density $\rho_a$, i, and $\rho-2\rho_f\alpha$ are neglected, Equation (12) may be approximated for Biot's modulus M as:

$$M \approx \frac{\rho V_{p1}^2 - (\lambda + 2G)}{\alpha^2}. \qquad \text{Equation (15)}$$

Further, a second term such as the Lamé parameter $\lambda$ may be substituted into Equation (15) using Equation (2) to further approximate Biot's modulus M as:

$$M \approx \frac{\rho V_{p1}^2 - \dfrac{2G(1-v)}{1-2v}}{\alpha^2}. \qquad \text{Equation (16)}$$

A person of ordinary skill in the art will appreciate that other vector operators may be applied to other poroelastodynamic relationships. Further, a person of ordinary skill in the art will appreciate that other first terms may be neglected and/or other second terms may be assumed.

In step 408, a value of the poromechanical property is determined by substituting well data into the vector-operated poroelastodynamic relationship.

For example, well data may be substituted into Equation (10) to determine a value for the shear modulus G for each discrete depth within a depth interval (318). Presenting a value for the shear modulus G for each discrete depth within a depth interval (318) may be denoted a "shear modulus G log." The overall density $\rho$ may be determined from the density log, fluid density $\rho_f$ may be assumed to be the same as the drilling mud density, porosity $\phi$ may be determined from a porosity log, and S-wave velocity $V_s$ may be determined from an acoustic log.

In another example, well data may be substituted into Equation (16) to determine a value for Biot's modulus M for each discrete depth within a depth interval (318). Presenting a value for Biot's modulus M for each discrete depth with a depth interval (318) may be denoted a "Biot's modulus M log." The overall density $\rho$ may be determined from the density log, fast P-wave velocity $V_{p1}$ may be determined from an acoustic log, and the shear modulus G may be determined using the value determined in the previous example that used Equation (10). Further, Poisson's ratio $v$ and Biot's coefficient $\alpha$ may be indirectly estimated from the gamma ray log following rock type (306) identification.

Figure 5:
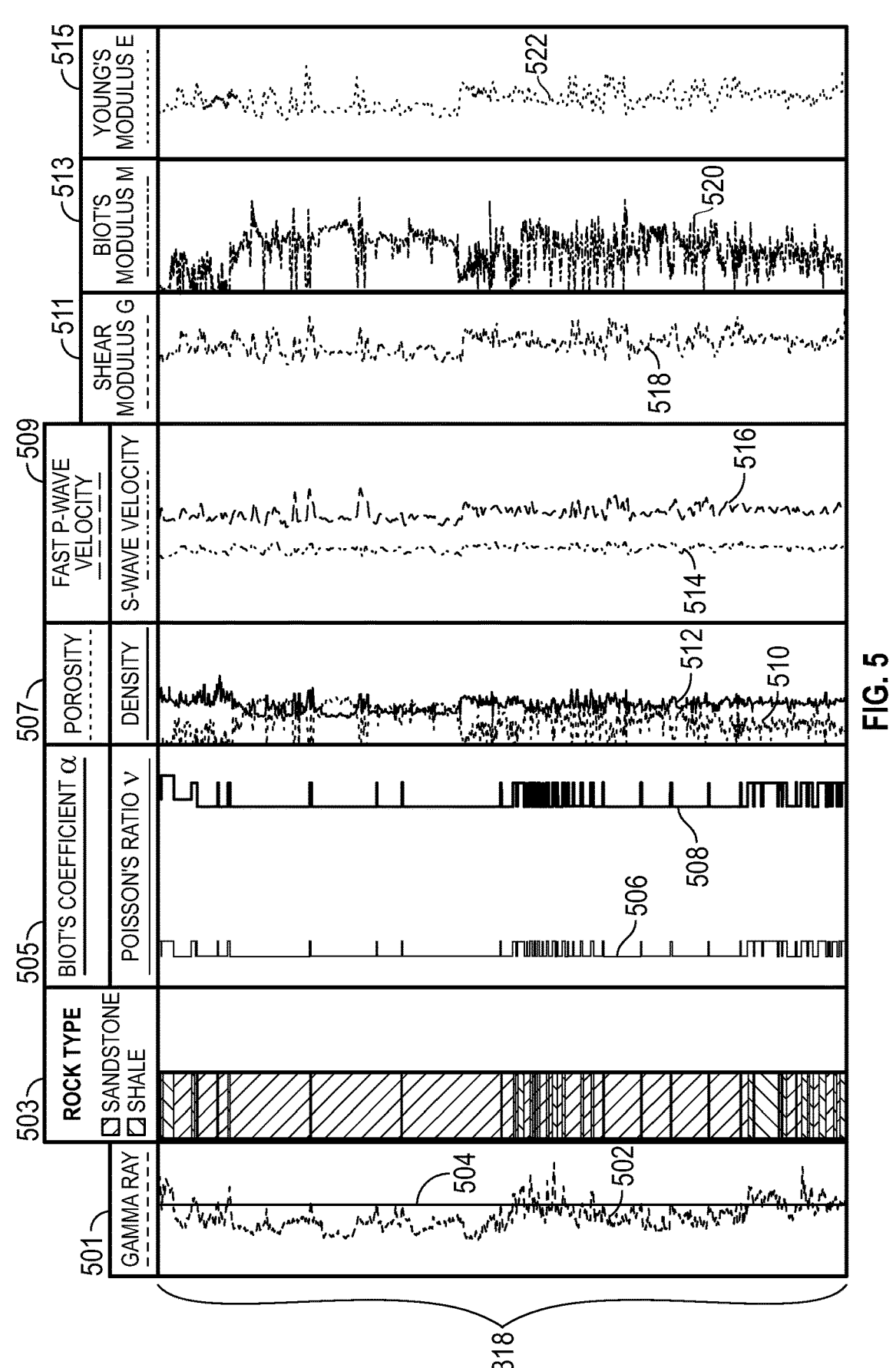
FIG. 5 presents logs in accordance with one or more embodiments.

FIG. 5 presents logs that show rock type (306) as well as values for physical properties, wave properties, and poromechanical properties in accordance with one or more embodiments. The values of the poromechanical properties of shear modulus G and Biot's modulus M are determined using the method (400) described in FIG. 4 in accordance with one or more embodiments.

Track 1 (501) of FIG. 5 presents a gamma ray log (502) acquired using a gamma ray logging tool. The gamma ray log (502) is used to separate a depth interval (318) by two rock types (306), sandstone and shale, based on a pre-defined threshold (504). Track 2 (503) presents the rock type (306) at each discrete depth. Track 3 (505) presents a Poisson's ratio $v$ log (506) and Biot's coefficient $\alpha$ log (508) for the depth interval (318). The Poisson's ratio $v$ log (506) and Biot's coefficient $\alpha$ log (508) are indirectly estimated from the gamma ray log (502) presented on Track 1 (501) following determination of rock type (306) presented on Track 2 (503).

Track 4 (507) presents a porosity log (510) acquired using a neutron porosity logging tool. Track 4 (507) also presents a density log (512) acquired using a density logging tool. The porosity log (510) is used to estimate porosity $\phi$. The density log (512) is used to estimate overall density $\rho$. Track 5 (509) presents two acoustic logs: an S-wave velocity $V_s$ log (514) and fast P-wave velocity $V_{p1}$ log (516). The S-wave velocity $V_s$ log (514) is acquired from a dipole shear sonic imager. The fast P-wave velocity $V_{p1}$ log (516) is acquired from a sonic logging tool.

Track 6 (511) presents a shear modulus G log (518) determined using the method (400) described in FIG. 4. Track 7 (513) presents a Biot's modulus M log (520) also determined using the method (400) described in FIG. 4. In some embodiments, a Young's modulus E log (522) may be determined as presented on Track 7 (515) by substituting Biot's modulus M and Poisson's ratio $v$ into Equation (3).

The value of a poromechanical property of fluid-saturated rock, such as the shear modulus M, Biot's modulus M, and Young's modulus E, may be used, at least in part, to inform a well trajectory plan and/or hydraulic fracturing plan. The well trajectory plan may define a path for a well (304) that efficiently penetrates a hydrocarbon reservoir (310) while minimizing drilling problems. For example, the value of a poromechanical property of rock surrounding a well (304) may inform safe mud density windows to maintain well hydrostatic pressure and prevent unwanted fluid flow into the well (304). Safe mud density windows may also prevent well casing collapse and lost circulation during drilling. The hydraulic fracturing plan may define what completion strategies should adequately stimulate the hydrocarbon reservoir (310). For example, the value of a poromechanical property of rock surrounding a well (304) may inform simulations used to predict how rock will fracture following hydraulic fracturing.

Figure 6:
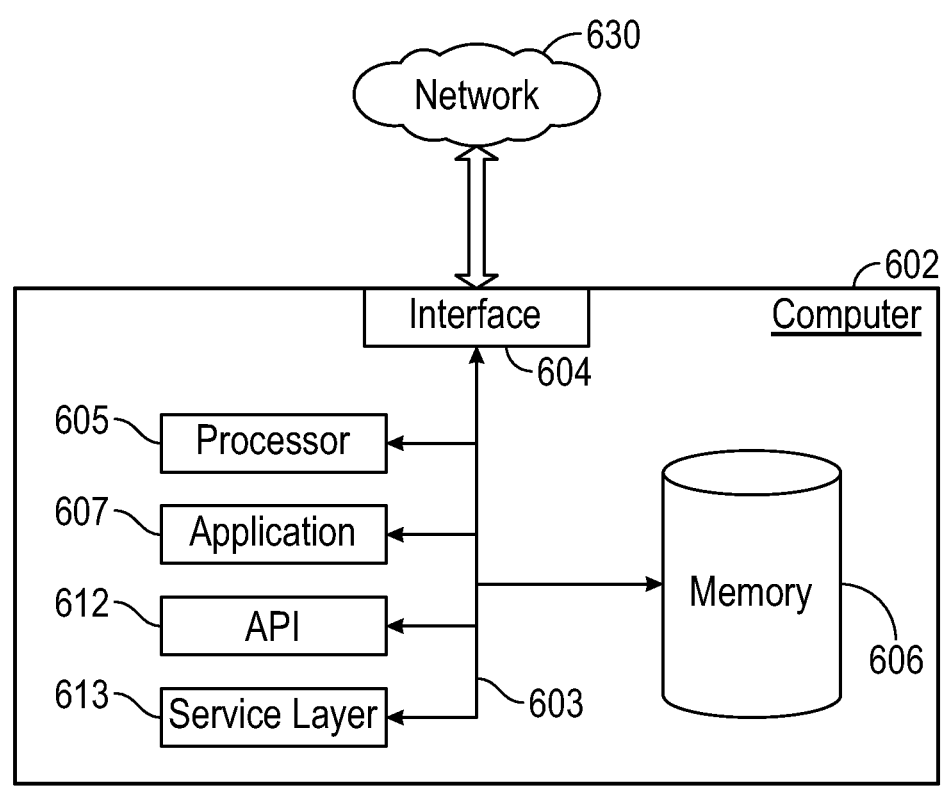
FIG. 6 illustrates a computer system in accordance with one or more embodiments.

FIG. 6 depicts a block diagram of a computer system (602) (hereinafter also "computer") used to provide computational functionalities associated with described algorithms, methods, functions, processes, flows, and procedures as described in this disclosure, according to one or more embodiments. Specifically, the computer (602) may be used to execute the method (400) described in FIG. 4. Further, the computer (602) may be a generic representation of a seismic interpretation workstation. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a graphical user interface. Specifically, a seismic interpretation workstation may include a robust graphics card for the detailed rendering of the well trajectory plan within the subterranean region of interest (308) that may be displayed and manipulated in a virtual reality system using 3D goggles, a mouse, or a wand.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system (602) or seismic interpretation workstation, wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In summary, a value of a poromechanical property of fluid-saturated rock may be determined using a poroelastodynamic relationship and well data. The well data may include well logs and/or measurements from rock core samples. The poroelastodynamic relationship may link a deformation of a fluid-filled rock to a poromechanical property of the fluid-saturated rock. Well data may then be substituted into a vector-operated poroelastodynamic relationship to determine the value of a poromechanical property.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A method comprising:

obtaining well data for a fluid-saturated rock;

obtaining a poroelastodynamic relationship linking a deformation of the fluid-saturated rock to a porome- chanical property of the fluid-saturated rock;

determining the poromechanical property of the fluid-saturated rock by applying a vector operator to the poroelastodynamic relationship;

determining a value of the poromechanical property by substituting the well data into the vector-operated poroelastodynamic relationship; and determining a hydraulic fracturing process using the value of the poromechanical property; and fracturing the fluid-saturated rock within a subterranean region of interest based on the hydraulic fracturing process.

2. The method of claim 1, further comprising:

determining a well trajectory plan using the value of the poromechanical property.

3. The method of claim 1, wherein the well data comprises a sonic log.

4. The method of claim 1, wherein the fluid-saturated rock comprises sandstone.

5. The method of claim 1, wherein the fluid-saturated rock comprises hydrocarbons.

6. The method of claim 1, wherein the deformation comprises a change in length.

7. The method of claim 1, wherein the poromechanical property comprises Biot's modulus.

8. The method of claim 1, wherein the vector operator comprises curl.

9. The method of claim 1, wherein the poroelastodynamic relationship is governed by Biot's theory of linear poroelas-todynamics.

10. The method of claim 1, wherein determining the poromechanical property further comprises:

neglecting a first term within the vector-operated poroelastodynamic relationship; and assuming a second term within the vector-operated poroelastodynamic relationship.

11. The method of claim 1, wherein the vector-operated poroelastodynamic relationship links a wave phase velocity to the poromechanical property of the fluid-saturated rock.

12. A system comprising:

a well logging system to obtain well data for a fluid-saturated rock;

a computer processor configured to:

receive the well data;

receive a poroelastodynamic relationship linking a deformation of the fluid-saturated rock to a porome-chanical property of the fluid-saturated rock;

determine the poromechanical property of the fluid-saturated rock by applying a vector operator to the poroelastodynamic relationship;

determine a value of the poromechanical property by substituting the well data into the vector-operated poroelastodynamic relationship; and determine a hydraulic fracturing process using the value of the poromechanical property; and a hydraulic fracturing system configured to fracture the fluid-saturated rock within a subterranean region of interest based on the hydraulic fracturing process.

13. The system of claim 12, further comprising a seismic interpretation workstation to determine a well trajectory plan using the value of the poromechanical property.

14. The system of claim 12, wherein the well logging system comprises a sonic logging system.

15. The system of claim 12, wherein the well logging system comprises a gamma ray logging system.

16. The system of claim 12, wherein the well logging system comprises a density logging system.

* * * * *